United States Patent [19]

Kettlewell et al.

[11] Patent Number: 5,433,658

[45] Date of Patent: Jul. 18, 1995

[54] TEST APPARATUS

[75] Inventors: Peter J. Kettlewell, Marston Mortaine; Mark E. R. Paice, Hitchen; William C. Whetlor, Kempston; Julian M. Sparrey, Silsoe, all of England

[73] Assignee: British Technology Group Limited, London, England

[21] Appl. No.: 211,620

[22] PCT Filed: Oct. 13, 1992

[86] PCT No.: PCT/GB92/01873

§ 371 Date: Apr. 7, 1994

§ 102(e) Date: Apr. 7, 1994

[87] PCT Pub. No.: WO93/07758

PCT Pub. Date: Apr. 29, 1993

[30] Foreign Application Priority Data

Oct. 18, 1991 [GB] United Kingdom ............... 9122124
Nov. 19, 1991 [GB] United Kingdom ............... 9124686

[51] Int. Cl.6 .................................. A22B 3/06
[52] U.S. Cl. ......................................... 452/59
[58] Field of Search ........................... 452/59, 58

[56] References Cited

U.S. PATENT DOCUMENTS

| 2,879,539 | 3/1959 | Cervin | 452/58 |
|---|---|---|---|
| 3,474,490 | 10/1969 | Groover et al. | 452/59 |
| 3,564,645 | 2/1971 | Brugman | 452/59 |
| 3,981,045 | 9/1976 | Collins | 452/58 |
| 4,044,607 | 8/1977 | Deal | 73/73 |
| 4,578,841 | 4/1986 | Nijhuis | 452/53 |
| 4,751,767 | 6/1988 | Walthier | 452/59 |
| 4,793,181 | 12/1988 | Djorup | 73/336.5 |
| 4,930,392 | 6/1990 | Wilson | 89/111 |
| 5,306,200 | 4/1994 | Ripol et al. | 452/59 |

FOREIGN PATENT DOCUMENTS

| 2855165 | 7/1980 | Germany . |
| 3233372 | 3/1984 | Germany . |
| 4002266 | 8/1991 | Germany . |
| 1188869 | 4/1970 | United Kingdom . |

Primary Examiner—Willis Little
Attorney, Agent, or Firm—Cushman, Darby & Cushman

[57] ABSTRACT

According to the present invention a test apparatus for testing stunning baths in which fowl, each having a head, legs, and a body having a center, are to be stunned, includes a casing containing; electric circuitry having resistances corresponding to the electrical resistance between; the head and a point in the center of the body, the legs and the point in the center of the body, and any single point of contact with an adjacent bird and the point in the center of the body; means for suspending the casing from a moving shackle train; means for completing an electric circuit involving a water bath and the shackle train; and means for monitoring the current passing through at least one of the resistances.

8 Claims, 5 Drawing Sheets

TEST APPARATUS

The present invention relates to electrical test equipment for use in conjunction with water baths as currently and as proposed used for pre-stunning fowl prior to slaughter.

There are various regulations aimed at minimising pain or distress of fowl being slaughtered for human consumption. One method of meeting the regulations involves stunning the fowl, prior to slaughter, by means of electric shocks. Fowl are suspended head down from a moving shackle train electrically connected to a neutral line and their heads brought into immersion with a water bath which is held at an elevated voltage relative to the neutral line. There are various problems with this system. For example, the resistances of individual fowl vary considerably and thus the use of a constant voltage stunning system results in a proportional variation in current passing through the fowl and a corresponding variation in the depth of stunning. The variable resistance caused by random contact of adjacent fowl on the shackle train can also cause variations in electric current through individual fowl.

As a result of these drawbacks in the conventional constant voltage stunning bath a constant current stunning bath has been developed by the applicant and is described in co-pending application GB 9122142.

There is a need for test apparatus, for use with stunning baths of both the constant voltage and constant current types, which can measure the current which will flow through fowl of different resistances.

According to the present invention a test apparatus, for testing stunning baths in which fowl, each having a head, legs and a body having a centre, are to be stunned, includes a casing containing;
electric circuitry having resistances corresponding to the electrical resistance between.
the head and the point in the centre of the body.
the legs and the point in the centre of the body, and
any single point of contact with an adjacent fowl and the point in the centre of the body;
and means for suspending the casing from a moving shackle train;
means for completing an electric circuit involving a water bath and the shackle train; and
means for monitoring the current passing through at least one of the resistances.

The common point in the centre of the body is theoretical and those skilled in the art will realise that its physical location is irrelevant in respect of the electric circuit theory.

The means for completing the electric circuit might, for example, include two conducting T-pieces connected to the casing and a conducting bob suspended from the casing, a suitable material for the T-pieces and the bob being brass.

One embodiment of the present invention will now be described, by way of example only, with reference to the accompanying diagrammatic drawings, of which;

Figure 1:
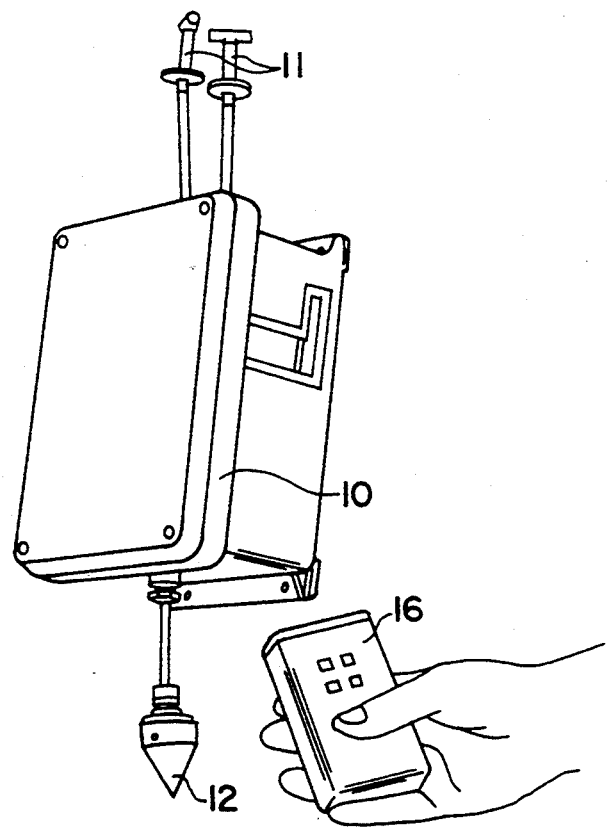
FIG. 1 is a perspective view of apparatus according to the invention.
Figure 2:
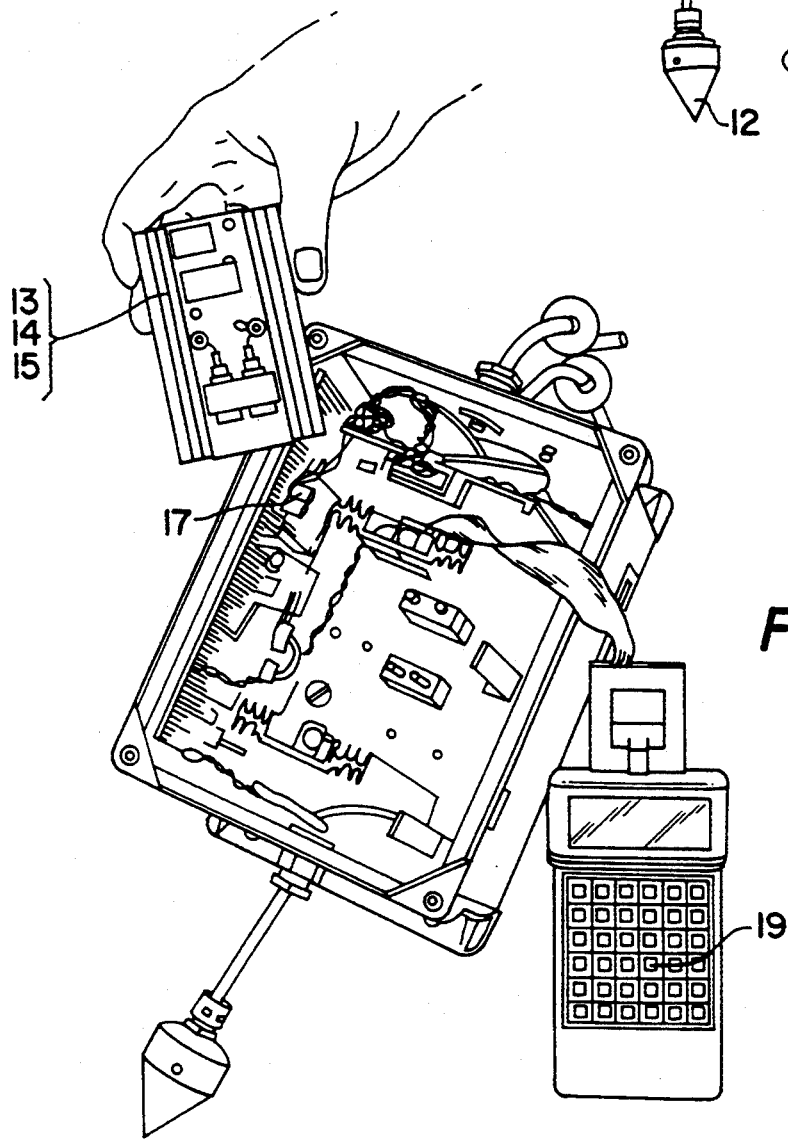
FIG. 2 is a perspective view of the apparatus with a cover removed.

A piece of test apparatus includes a casing 10 (FIG. 1) has two brass T-pieces 11 extending from one end thereof and a brass bob 12 extending from the other end. The T-pieces 11 and bob 12 are electrically connected to a circuit (FIG. 3) which includes resistances 13, 14 and 15 (FIG. 2) within the apparatus. The resistances 13, 14, 15 correspond respectively to the resistance between the head and a point in the centre of a fowl's body, the resistance between the legs and the point in the centre of the body, and any single point of contact with an adjacent fowl and the point in the centre of the body, and are in the form of plug-in calibrated networks (see FIG. 2).

Figure 3:
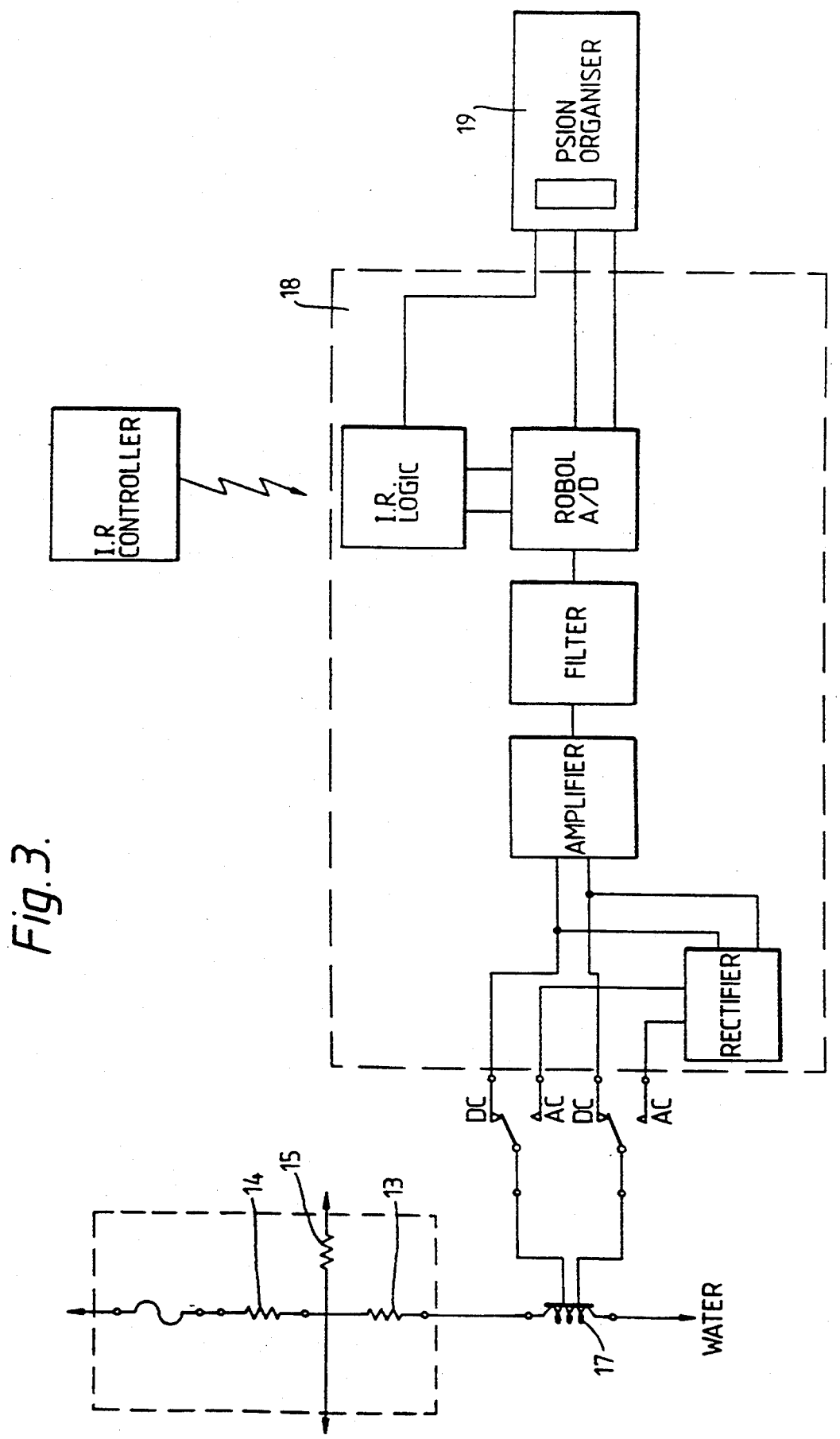
FIG. 3 is a simplified diagram of the circuit within the apparatus.

Also within the casing 10 are a Hall effect current transducer 17, processing electronics, shown generally at 18 in FIG. 3, for processing the output of the current transformer 17, and a storage unit 19 which might be, for example, a PSION Organiser II.

Figure 4:
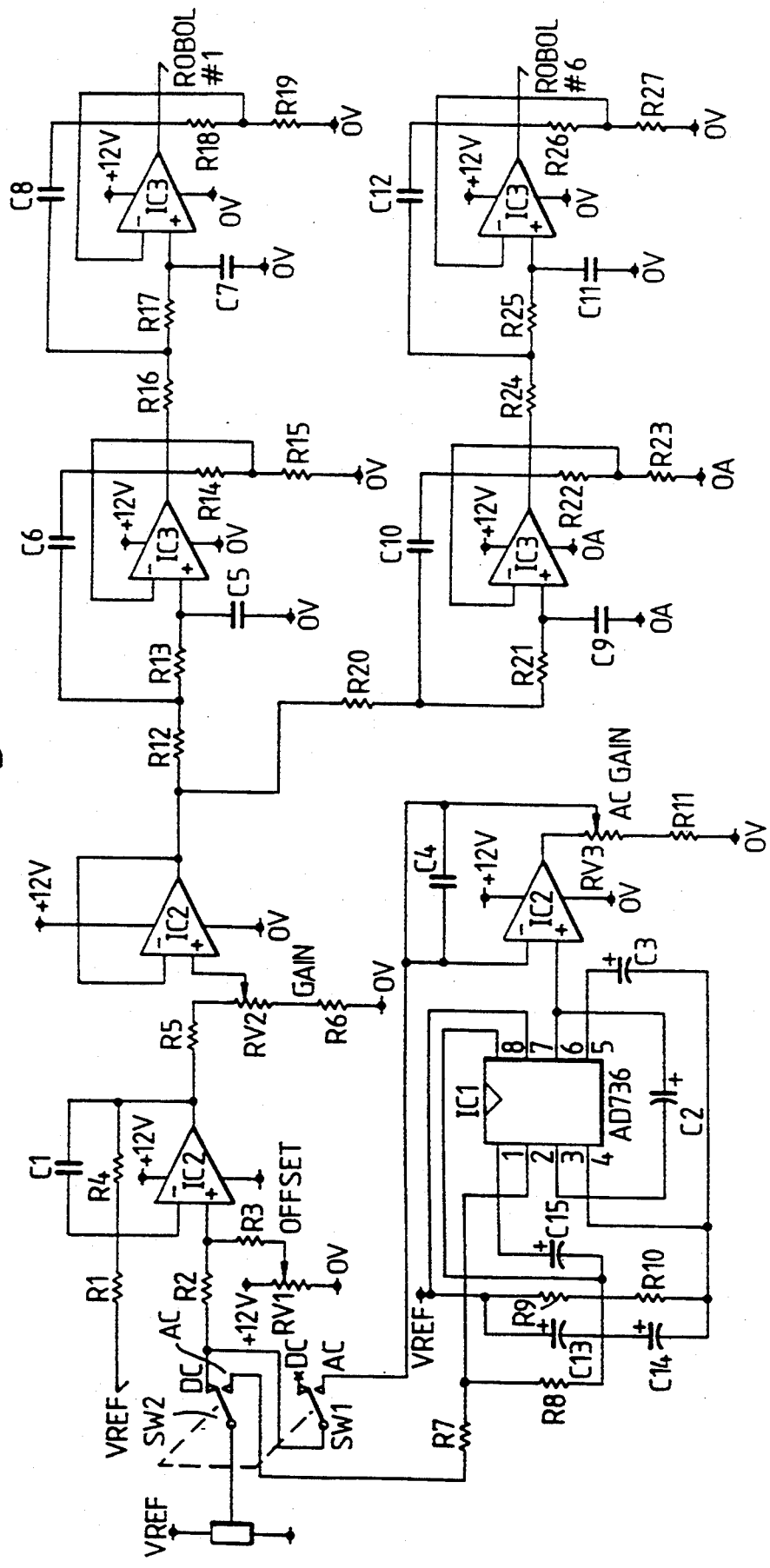
FIG. 4 is a more detailed diagram of the circuit within the apparatus.

A suitable circuit for use in the apparatus is shown in FIG. 4.

Figure 5:
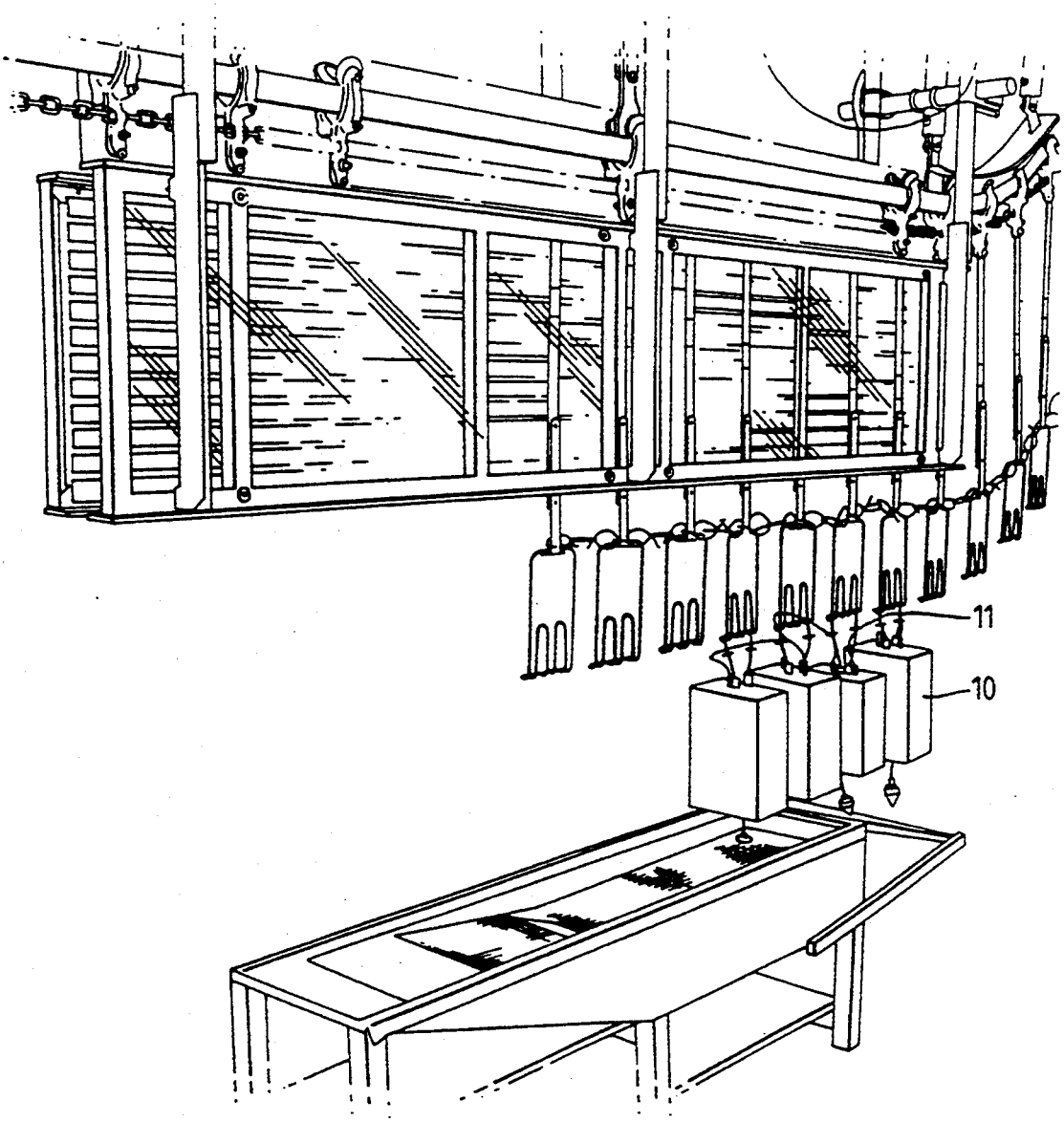
FIG. 5 is a perspective view of several pieces of apparatus in use.
Figure 6:
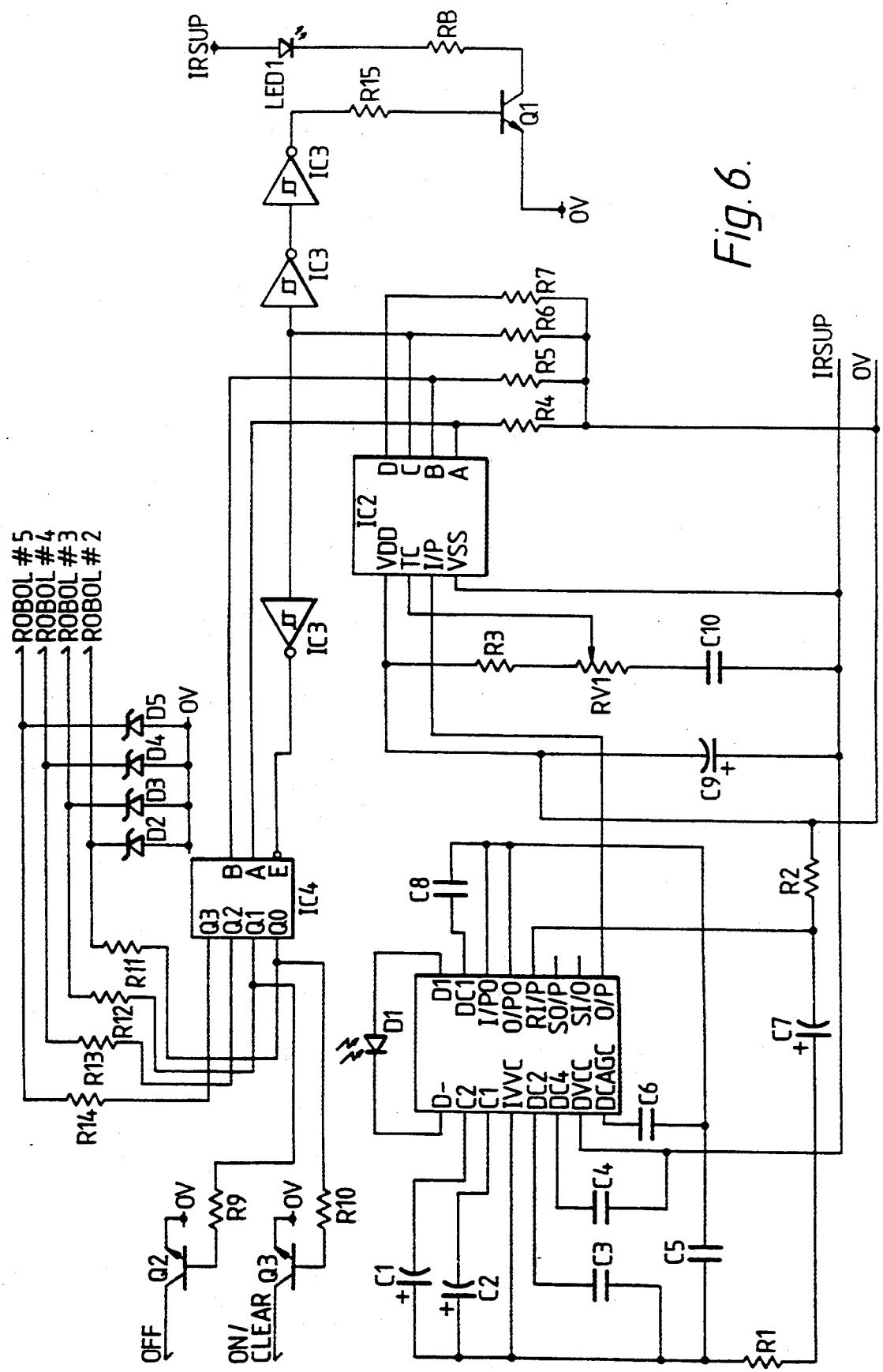
FIG. 6 is a circuit diagram of a remote control unit.

In use a number of apparatus are suspended by T-pieces 11 to a moving shackle train 20 (FIG. 5) in a manner analagous to fowl. The shackle train is moved, bringing the bobs 12 on the apparatus 10 into contact with a water bath 21. The water bath 21 and shackle train are at different voltages and as a result of immersion of the bobs 12 in water an electric current passes through the apparatus 10. A remote control unit 16 (FIG. 1, circuit shown in FIG. 6) is used to activate the recording circuitry, and the current and its behaviour are recorded in the storage unit 19. The various resistances 13,14, 15 might be varied between consecutive test runs to simulate various sizes and types of fowl. Also the effect of contact between adjacent fowl can be simulated.

It will be realised that many variations of the invention ape possible. For example, results may be transmitted from the apparatus 10 for storage and analysis, rather than being stored within the apparatus.

It will be realised that the physical dimensions of the apparatus 10, in terms of length between the ends of T-pieces 11 and bob 12, should simulate the length of fowl with which a water bath under test is concerned. The length between the ends of the T-pieces and the bob is preferrably adjustable, to simulate different fowl or variations in length beween individual fowl of a particular species.

When used for testing of apparatus in a commercial processing plant the apparatus may be used to replace a fowl in the processing line, and can have the "contact to centre point" resistance 15 connected to an adjacent fowl.

What is claimed is;

1. A test apparatus, for testing stunning baths in which fowl, each having a head, legs and a centre of the body, are to be stunned, characterised in that it includes a casing (10) containing;
electric circuitry having resistances (13, 14, 15) corresponding to the electrical resistance between;
the head and a point in the centre of the body (13),
the legs and the point in the centre of the body (14), and
any single point of contact with an adjacent fowl and the point in the centre of the body (15);

means (11) for suspending the casing (10) from a moving shackle train (20);

means (12) for completing an electric circuit involving a water bath (21) and the shackle train (20);

and means (17,18) for monitoring the current passing through at least one of the resistances (13, 14, 15).

2. Apparatus as claimed in claim 1 wherein the current monitored is that through the head to centre point resistance (13).

3. A test apparatus as claimed in claim 1 or in claim 2 including recording apparatus (19).

4. A test apparatus as claimed in claim 3 wherein the recording apparatus (19) is contained within the casing (10).

5. Apparatus as claimed in claim 3 wherein the recording apparatus (19) is activated by remote control means (16).

6. Apparatus as claimed in claim 5 wherein the remote control means (16) includes an infra-red transmitter.

7. Apparatus as claimed in claim 4 wherein the recording apparatus (19) is activated by remote control means (16).

8. Apparatus as claimed in claim 8 wherein the remote control means (16) includes an infra-red transmitter.

* * * * *